Jan. 26, 1932.  R. A. A. COUZINET  1,842,858
HYDROPLANE
Filed June 25, 1930   2 Sheets-Sheet 1

Inventor
R.A.A. Couzinet
By Marks & Clerk
Attys.

Jan. 26, 1932. R. A. A. COUZINET 1,842,858
HYDROPLANE
Filed June 25, 1930  2 Sheets-Sheet 2
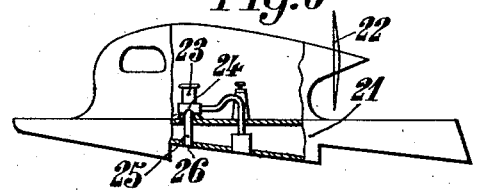
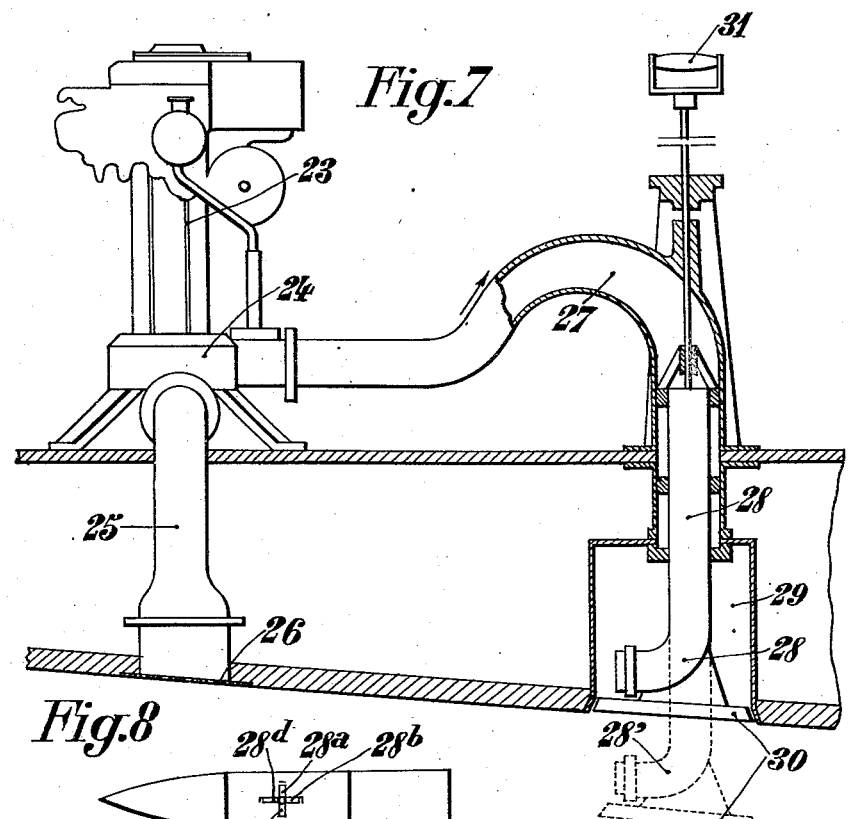
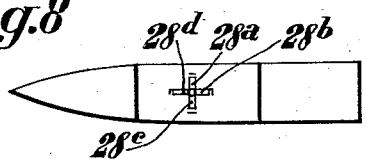
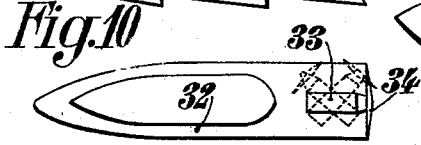
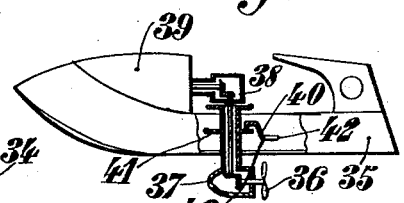
Inventor
R. A. A. Couzinet
By Marks Clerk
Attys.

Patented Jan. 26, 1932

1,842,858

UNITED STATES PATENT OFFICE

RENÉ ALEXANDRE ARTHUR COUZINET, OF LEVALLOIS-PERRET, FRANCE

HYDROPLANE

Application filed June 25, 1930, Serial No. 463,792, and in France July 2, 1929.

The present invention relates to improvements in propelling and steering devices for nautical vehicles and, particularly for hydroplanes.

The improvements forming the subject-matter of the present invention consist in ensuring the partial or total propulsion of nautical vehicles by utilizing a propelling or tractor element which can substantially be set in all directions in order to simultaneously ensure the propulsion and steering of the vehicle.

The above mentioned feature can give rise to numerous forms of construction which are obviously all included in the scope of the present invention and can differ from each other, particularly—

By the propelling or tractor element used, which can be of any aerial or marine type;

By the means allowing to set the propelling or tractor element, these means which are all included in the scope of the invention being variable according to circumstances.

The invention also consists in the new application, for the propulsion of nautical vehicles and more particularly of hydroplanes, of means such as air or water turbines, pumps or the like, having at least one suction conduit immersed, either in the air or in water, and at least one delivery conduit immersed in water; this delivery conduit is fixed or angularly movable according as it is used, either solely as propelling means, or simultaneously as propelling and steering means.

The invention has also for object a form of construction of a hydroplane in which, in order to facilitate the displacement of the latter upon coming ashore, or between boats, and when the aerial propeller is stopped owing to the danger its rotation would present when working the hydroplane, use is made, on the latter, of a delivery conduit arranged under the hydroplane and preferably in its central region; this delivery conduit is connected to a steering or like handwheel which facilitates movement of the said conduit, at least in one horizontal plane, in all directions; moreover, this conduit can be substantially moved vertically, in translation, in order to allow its collapsing within a housing, thereby eliminating the head resistance this conduit would produce during normal running of the hydroplane propelled or pulled by its aerial propeller, the said housing being preferably closed by an obturator integral with the said conduit.

The invention has also for object the new application, to a hydroplane, or the new combination with the latter, of at least one marine propeller and of manual or mechanical means for actuating this propeller.

This new combination or application can give rise to numerous forms of construction which are obviously all included in the scope of the present invention and can differ from each other—

Either by the shape, constitution, arrangement and number of the marine propellers used;

Or by the means for actuating the said propeller; these means, which are manual or mechanical means, are constituted in the latter case by one of the engines driving the aerial propeller, or by an independent engine.

The invention also has for its object the provision of means interposed between the shaft of the engine driving the marine propeller and the latter, these means being constituted by a reversing gear controlled by any suitable means and, preferably, by pedals which correspond, one to forward running, the other, to backward running; the movable parts of the preceding device ensure, moreover, at the suitable moment, the starting of the engine.

A further object of the invention resides in the provision of a device for obtaining a circulation of water for cooling the main engine, and accessorily for feeding an intermediate tank or a cock arranged in the hydroplane; this device is constituted by a port preferably controlled by an obturator, suitably provided in one of the immersed regions of the hydroplane, and in which is delivered, owing to the speed of the hydroplane, water which flows in suitable pipe lines communicating with the said port.

The accompanying drawings illustrate, by way of example only, forms of construction of nautical vehicles, and more particularly of improved hydroplanes in accordance with the invention.

Fig. 6 is a diagrammatic elevation of a hydroplane provided with an operating device in accordance with the invention.

Fig. 7 is a longitudinal section, on an enlarged scale, of the operating device illustrated in the preceding figure.

Fig. 8 is an underside view of a hydroplane provided with a modified operating device in accordance with the invention.

Fig. 9 is an elevation of a hydroplane provided with an aerial propeller capable of being orientated.

Fig. 10 is a plan view corresponding to the preceding figure.

Fig. 11 is an elevation, with partial axial section, of a motor boat provided with a marine propeller capable of being orientated.

Figure 1:
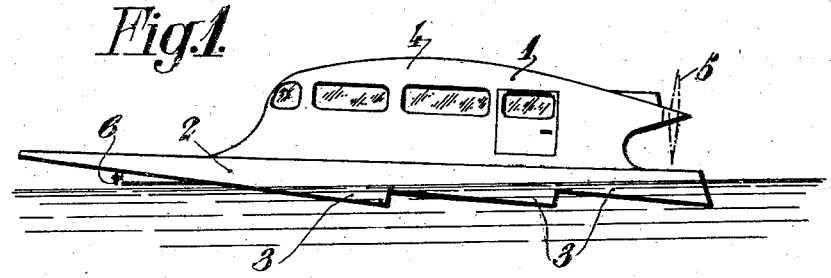
Fig. 1 is an elevation of a hydroplane moving at full speed.
Figure 2:
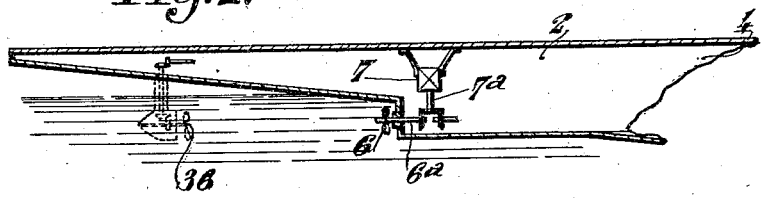
Fig. 2 is a longitudinal section of the front portion of the hydroplane, the latter being at rest or moving at a small speed.

The hydroplane illustrated in Figs. 1 and 2, is constituted by a hull 2 provided with stepped portions 3 and by a cabin 4, the rear portion of which is used as a support for an engine actuating an aerial propeller 5.

The hydroplane which is shown in Fig. 1 as moving at full speed, is provided, in accordance with the invention, with a marine propeller 6 which is used for the navigation at reduced speed of the hydroplane, the aerial propeller being stationary.

It will be noted that the propeller 6 is located in the region of the hull lifted out of the water, when the hydroplane navigates at full speed, so that this propeller 6 does not offer any resistance to the advance of the hydroplane. In position of rest, or when moving at reduced speed, the propeller 6 is immersed as illustrated in Fig. 2, and can be set in action by using, either the main engine, or a secondary engine 7 of small power, which is preferably an electric motor fed by a battery (not shown).

Figure 3:
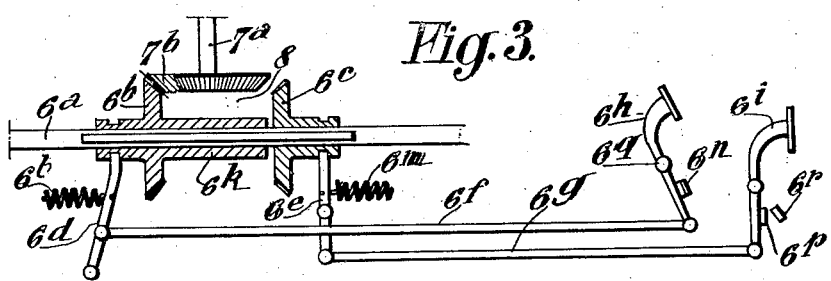
Fig. 3 is an elevation, with partial section, of the clutch device and of the reversing gear of the marine propeller.

As more clearly shown in Fig. 3, the shaft $6^a$ carrying the propeller 6, is connected to the shaft $7^a$ of the motor 7 through the medium of the reversing gear 8 constituted, on the one hand, by a pinion $7^b$ secured at the end of the shaft $7^a$ and, on the other hand, by pinions $6^b$ and $6^c$ angularly rigid with the shaft $6^a$, but movable in translation on the latter. The displacements in translation of the pinions $6^b$ and $6^c$ are obtained through the medium of fork levers $6^d$, $6^e$ and of links $6^f$ and $6^g$, respectively controlled by pedals $6^h$ and $6^i$. A tubular extension $6^k$ of the pinion $6^b$ avoids the simultaneously throwing in gear of the pinions $6^b$ and $6^c$. The system is automatically returned to its disengaged position through the medium of resiliently distortable members, such as springs $6^l$ and $6^m$. The pedals $6^h$ and $6^i$ carry, moreover, contacts $6^n$ and $6^p$ which come in engagement, at the end of the throwing in gear action which contacts $6^q$ and $6^r$ closing the circuit of the electric motor.

Figure 4:
Fig. 4 is a constructional modification.

In a constructional modification, illustrated in Fig. 4 the shaft $7^a$ of the electric motor 7 directly carries the propeller 6. The starting of the motor and the reversal of direction of running are effected by acting upon the pedals $6^h$, $6^i$ movable in translation and controlling starting rheostats $6^s$ and $6^t$. The reversal of the motor is effected by the means actually used, and particularly by changing the direction of energization, or by varying the position of the brushes.

Figure 5:
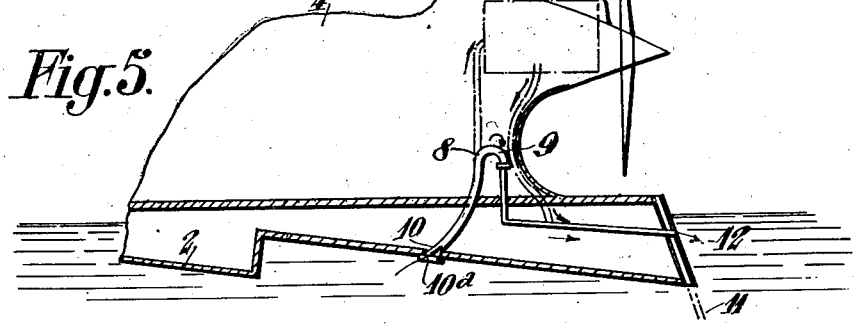
Fig. 5 is a longitudinal section of the rear portion of the hydroplane and shows a water circulation device.

Fig. 5 illustrates a device ensuring, through the medium of conduits 8, either the circulation of the cooling water of the main engine, or the supply with water of a cock 9. The conduit 8 opens, for that purpose, in a port 10 provided at the lower part of the hull 2. The port 10 is controlled by a valve $10^a$ actuated, from a distance, by any suitable means, the water flowing in the direction indicated by the arrows.

For rapidly stopping the hydroplane, a skid 11, illustrated in dot and dash lines in Fig. 5, can be moved in the direcẗon of the arrow 12 by any suitable means.

A constructional modification, illustrated in dot and dash lines in Fig. 2, consists in providing a marine propeller 36 capable of being orientated in any direction. Such an arrangement is more particularly described and illustrated in Fig. 11 in which the propeller capable of being orientated is applied to a motor boat.

The hydroplane 21, illustrated in Fig. 6, is provided, as usual, with an aerial propeller 22. This hydroplane is also provided, as more particularly shown in Fig. 7, with an auxiliary engine 23 actuating a pump or turbine 24 exerting a suction through a tube 25 opening, through a rose 26 at the lower part of the hydroplane. The water sucked is delivered through a tube 27 terminated by a delivery conduit 28 which can be set in any direction. This conduit 28 is vertically movable in translation and can collapse within a housing 29 closed, when the conduit is collapsed, by an obturator or plug 30 integral with this conduit. The operation of the latter is ensured by a handle 31 which can be replaced by an operating handle.

It is obvious that this device, which is given by way of example, is capable of receiving numerous modifications which are obviously all included in the scope of the invention. One of these modifications is illustrated in Fig. 8, in which the conduit 28 capable of being orientated, is replaced by several tubes $28^a$, $28^b$, $28^c$, and $28^d$ variously orientated and which can be obturated, at will, so as to ensure by the delivery of the fluid in one or more of these tubes, the formation of a component of propulsion suitably directed.

The hydroplane 32 illustrated in Fig. 9 comprises a motor unit 33 provided with an aerial propeller 34. This motor unit can be set in any direction, as shown in Fig. 10, in order to simultaneously allow the propulsion and steering of the hydroplane. The rotary displacements are effected by means of any suitable devices (not shown). In case the orientation device comprises a central vertical shaft, the latter can be used for the passage of fuel and lubrication pipings.

The motor boat 35, illustrated in Fig. 11, comprises a marine propeller 36, the shaft of which is journalled in a casing 37 which can be angularly moved by an operating handwheel 38 rigid with the casing 37. The actuation of the propeller is ensured by an engine 39 and through the medium of pinions or any other means. The casing 37 can, moreover, be locked in any suitable angular position, by suitable means and particularly, as shown in the drawings, by a locking fingers 40 entering corresponding notches provided in a crown 41 rigid with the casing 37. The finger 40 is rigid with a control pedal 42 pivoted at 43.

It is to be understood that the forms of construction described and illustrated are only simple examples capable of receiving modifications, as well in the constitution of the various elements as in the relative arrangement of the latter. All modifications which do not alter in any way the main features above set forth and the object sought for, remain included in the scope of the invention.

What I claim as my invention and desire to secure by Letters Patent is:

1. In a hydroplane comprising a hull, an aerial propeller for running at high speed and independent marine propelling means for operating at reduced speed in the ports or for coming alongside when the aerial propeller is stopped, the arrangement of the marine propelling means in the region where the front portion of the hull is lifted out of the water so that the said marine propelling means are immersed only when the hydroplane is stopped or running at reduced speed which does not cause the front portion of the hull to be lifted out of the water.

2. In a hydroplane comprising a hull, an aerial propeller for running at high speed and a marine propeller for running at reduced speed in ports or for coming alongside when the aerial propeller is stopped, the arrangement of the said marine propeller in the region where the front part of the hull is lifted out of the water so that the said marine propeller is immersed only when the said aerial propeller is stopped and the front part of the hull is not lifted out of the water, the said marine propeller being out of the water on account of the lifting when the said hydroplane is displaced at high speed under the action of its aerial propeller.

In testimony whereof I have signed this specification.

RENÉ ALEXANDRE ARTHUR COUZINET.